United States Patent [19]
Jung

[11] Patent Number: 5,967,633
[45] Date of Patent: Oct. 19, 1999

[54] CHASSIS ASSEMBLY FOR COMPUTERS

[75] Inventor: Hae-Soo Jung, Suwon, Rep. of Korea

[73] Assignee: SamSung Electronics Co., Ltd., Suwon, Rep. of Korea

[21] Appl. No.: 09/061,031

[22] Filed: Apr. 16, 1998

[30]    Foreign Application Priority Data

Apr. 16, 1997 [KR]  Rep. of Korea ...................... 97-14010

[51] Int. Cl.⁶ .................................................. A47B 81/00
[52] U.S. Cl. ...................... 312/223.2; 292/107; 292/209; 312/263; 312/108; 312/293.3
[58] Field of Search .............................. 312/223.1, 223.2, 312/223.3, 293.3, 265.6, 263, 108, 348.2, 111, 140; 361/683, 695, 724; 292/DIG. 38, 107, 209

[56]              References Cited

U.S. PATENT DOCUMENTS

| | | |
|---|---|---|
| 5,159,528 | 10/1992 | Murphy . |
| 5,175,670 | 12/1992 | Wang . |
| 5,227,957 | 7/1993 | Deters . |
| 5,271,152 | 12/1993 | Murphy . |
| 5,372,415 | 12/1994 | Tisbo et al. ............................. 312/108 |
| 5,397,176 | 3/1995 | Allen et al. ........................... 312/223.2 |
| 5,417,012 | 5/1995 | Brightman et al. . |
| 5,491,611 | 2/1996 | Stewart et al. ....................... 312/263 X |
| 5,547,272 | 8/1996 | Paterson et al. ..................... 312/204 X |
| 5,593,219 | 1/1997 | Ho .................................... 312/223.1 X |
| 5,717,570 | 2/1998 | Kikinis . |
| 5,743,606 | 4/1998 | Scholder .............................. 312/223.2 |

*Primary Examiner*—Peter M. Cuomo
*Assistant Examiner*—Stephen Vu
*Attorney, Agent, or Firm*—Robert E. Bushnell, Esq.

[57]                ABSTRACT

A chassis assembly for computers is disclosed. In the chassis assembly, the main chassis and bottom chassis are suitable for being manually assembled and disassembled, thus allowing a user to easily handle the assembly with improved work efficiency while repairing or upgrading a computer. The main chassis, having front and rear panels, is open at the bottom between the lower edges of the front and rear panels. The bottom chassis is detachably mounted to the open bottom of the main chassis. The chassis assembly also has a lock unit which is mounted to the rear portion of the bottom chassis. The lock unit normally retains the position of the bottom chassis relative to the main chassis and selectively allows the bottom chassis to be manually removed from the main chassis.

15 Claims, 5 Drawing Sheets

CHASSIS ASSEMBLY FOR COMPUTERS

CLAIM OF PRIORITY

This application makes reference to, incorporates the same herein, and claims all benefits accruing under 35 U.S.C. §119 from an application for CHASSIS ASSEMBLY FOR COMPUTERS earlier filed in the Korean Industrial Property Office on the 16$^{th}$ of April 1997 and there duly assigned Ser. No. 14010/1997.

BACKGROUND OF THE INVENTION

1. Field of the Invention

The present invention relates, in general, to chassis assemblies for computers and, more particularly, to a chassis assembly for tower desktop computers, including a bottom chassis and main chassis suitable for being manually assembled and disassembled, thus allowing a user to easily handle the assembly with improved work efficiency while repairing or upgrading a computer.

2. Related Art

An exemplary chassis assembly for tower desktop computers comprises two chassis: a main chassis and a bottom chassis. The main chassis is open at the top and one side and is closed at the front and back, thus having front and rear panels. The bottom chassis is integrated with the main chassis across the bottom between the front and rear panels. The main chassis provides a mounting area for a plurality of auxiliary units, such as a power supply, a hard disc drive, a floppy disc drive and a compact disc drive, while the bottom chassis provides a mounting area for a mother board. An option board is installed in the main chassis at a position perpendicular to the mother board. Formed on the option board are a plurality of expansion slots for mounting option cards to the main chassis. The above chassis assembly is covered with a detachable cover.

However, such a chassis assembly is problematic since the main and bottom chassis and are integrated into a single structure. The chassis assembly, with the integrated main and bottom chassis, can be produced through two methods. That is, the integrated bottom chassis can be formed by bending the lower portion of the front or rear panel of the main chassis. Alternately, such a bottom chassis can be formed separate from the front or rear panel prior to being integrated with the lower edges of the front and rear panels into a single body through a riveting or spot welding process. Since the chassis assembly has an integrated structure as described above, the cover has to be removed from the chassis assembly when it is necessary to repair or upgrade the computer. The typical chassis assemblies thus reduce work efficiency while repairing or upgrading a computer and are inconvenient to users.

Particularly when the bottom chassis is formed separate from the main chassis and is integrated with the main chassis into a single body through a riveting or spot welding process, the process of producing the chassis assembly is complicated, reducing productivity of the chassis assembly. When the bottom chassis is integrally formed with the main chassis through a pressing process, the size of the main chassis is enlarged, resulting in time consumption while preparing metal molds for the main chassis.

U.S. Pat. No. 5,159,528 to Murphy, entitled Modular Personal Computer, discloses a modular personal computer and U.S. Pat. No. 5,271,152 to Murphy, entitled Process For Making A Computer Tower Chassis Using modules, discloses a process for making a computer tower chassis using modules. These U.S. patents to Murphy disclose a computer tower chassis having a base system unit and a main circuit board subassembly, with the base system unit including a base system frame having a front panel and a rear panel and a supporting frame therebetween. The main circuit board subassembly includes a main circuit board, an input/output board and cable, speaker and cable, fan assembly and cable, keyboard cable, expansion card and expansion card guides.

Also, U.S. Pat. No. 5,175,670 to Wang, entitled Housing Structure For A Computer, discloses a housing structure for a computer. Wang discloses a high capacity computer case that includes a front case plate, a rear case plate, three reinforced rods, a computer locking plate, a bottom plate, and a slot clip member. Located between the front case plate and the rear case plate in a parallel manner are the three reinforced rods. The computer locking plate is disclosed as being arranged at the lower half portion of one side of the computer case, with both ends of the locking plate, in conjunction with the three reinforced rods, being spot welded to the front and the rear case plates. The bottom plate is disclosed as being welded respectively to the front case plate, the rear case plate, and the three reinforced rods. A slot clip member of rectangular construction is disclosed as being a supplementary device including at one end thereof two lugs having thereon arresting portions and at other end thereof a predetermined number of clip grooves for disposing a longer expansion slot card.

U.S. Pat. No. 5,227,957 to Deters, entitled Modular Computer System With Passive Backplane, discloses a modular computer chassis with a passive backplane that is provided for a personal computer system with a plurality of open-ended and vertically or horizontally interconnectable bays, or a single case with bays, for slidably receiving component trays each having a printed double sided bus direction adaptor board with a bus connector at one end and a female bus connector mounted to the top surface for attaching an expansion card parallel to the board. Also, a front cover, or individual tray covers, cover the front of the chassis as a locking and security mechanism.

U.S. Pat. No. 5,417,012 to Brightman et al., entitled Equipment Cabinet Door Mountable On Either Side And Having A Central Latch, discloses an equipment cabinet door mountable on either side and having a central latch. The equipment cabinet is disclosed as employing a rack-mountable equipment enclosure surrounded by a base, a cap, and front and rear covers. Each cover consists of a bezel and a door reversibly mounted thereon via removable hinge pins. The bezels have sidewalls that rest against ledges on the edges of the enclosure to receive support therefrom, and the door has a centrally-located latch, with the latch having a pawl with an eccentric catch portion that engages a latch opening on a ledge extending from the bezel. The pawl also has a tab that rests between the ends of an arcuate raised portion on the rear of the door to limit the rotational travel of the pawl.

U.S. Pat. No. 5,491,611 to Stewart et al., entitled Aligned Quick Connect Cover For A Computer System, discloses an aligned quick connect cover for a computer system. A computer system is disclosed having a cover for a frame, whereby the cover has a user panel and a service panel each including a plurality of inwardly extending and angled slots to be aligned with rearwardly facing tabs on the frame to facilitate a quick sliding connection of the cover to the frame.

Also, U.S. Pat. No. 5,717,570 to Kikinis, entitled Enhanced Mini-Tower Computer Architecture discloses an enhanced mini-tower computer architecture. A computer enclosure is disclosed that has a drive bay for multiple hard disk drives implemented in the rear panel rather than in the front, providing sufficient storage capacity for use as a file server in a mini-tower architecture. In an alternative embodiment, Kikinis discloses the side panels are designed for quick removal by moving a panel against a spring element for release. Also, in an embodiment Kikinis discloses access to the drive bay in the rear panel is controlled by a security door with a lock, and security screws for the removable side panels are located behind the security door.

SUMMARY OF THE INVENTION

Accordingly, the present invention has been made keeping in mind the above problems occurring in the prior art, and an object of the present invention is to provide a chassis assembly for computers, which includes a bottom chassis and main chassis suitable for being manually assembled and disassembled, thus allowing a user to easily handle the assembly with improved work efficiency while repairing or upgrading a computer.

In order to accomplish the above object, the present invention provides a chassis assembly for computers, comprising: a main chassis having front and rear panels with an open bottom being defined between lower edges of the front and rear panels; a bottom chassis detachably mounted to the open bottom of the main chassis; and a lock unit mounted to a rear portion of the bottom chassis at a predetermined position and adapted for normally retaining the position of the bottom chassis relative to the main chassis and selectively allowing the bottom chassis to be manually removed from the main chassis.

Also, according to the present invention, a lock unit or lock assembly is provided for use with a chassis assembly for a computer. The lock unit or lock assembly permits a user to handle the lock unit from the outside of a bottom chassis of a computer. Also, the present invention provides a guide assembly for a chassis assembly for a computer having a plurality of guide rails that extend perpendicular to a detachable bottom chassis of the computer assembly and are useful for precisely guiding an option card into an expansion slot located within the chassis assembly for the computer. The guide assembly permits an expansion slot to be accessed through a removable bottom chassis of a computer assembly.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
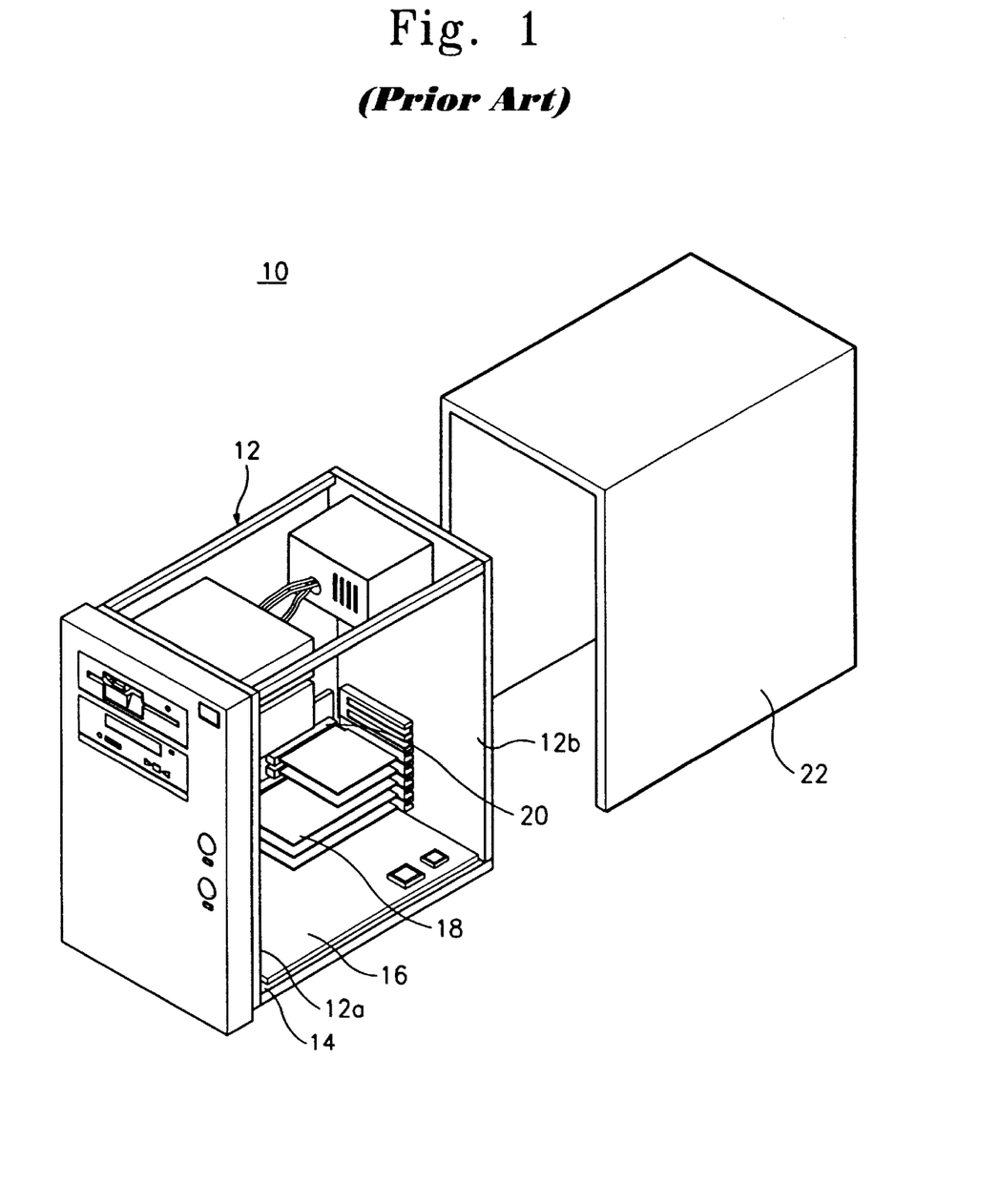
FIG. 1 is a perspective view showing the construction of an exemplary chassis assembly for computers.

An exemplary chassis assembly for tower desktop computers is shown in FIG. 1. As shown in the drawing, the chassis assembly 10 comprises two chassis: a main chassis 12 and a bottom chassis 14. The main chassis 12 is open at the top and one side and is closed at the front and back, thus having front and rear panels 12a and 12b. The bottom chassis 14 is integrated with the main chassis 12 across the bottom between the front and rear panels 12a and 12b. The main chassis 12 provides a mounting area for a plurality of auxiliary units, such as a power supply, a hard disc drive, a floppy disc drive and a compact disc drive, while the bottom chassis 14 provides a mounting area for a motherboard 16. An option board 17 is installed in the main chassis 12d at a position perpendicular to the motherboard 16. Formed on the option board 17 are a plurality of expansion slots 20 for mounting option cards 18 to the main chassis 12. The above chassis assembly 10 is covered with a detachable cover 22.

However, such a chassis assembly 10 is problematic since the main and bottom chassis 12 and 14 are integrated into a single structure. The typical chassis assembly 10, with the integrated main and bottom chassis 12 and 14, can be produced through two methods. That is, the integrated bottom chassis 14 can be formed by bending the lower portion of the front or rear panel 12a, 12b of the main chassis 12. Alternately, such a bottom chassis 14 can be formed separate from the front or rear panel 12a, 12b prior to being integrated with the lower edges of the front and rear panels 12a and 12b into a single body through a riveting or spot welding process. Since the chassis assembly 10 has an integrated structure as described above, the cover 22 has to be removed from the chassis assembly 10 when it is necessary to repair or upgrade the computer. The typical chassis assemblies thus reduce work efficiency while repairing or upgrading a computer and are inconvenient to users.

Particularly when the bottom chassis 14 is formed separate from the main chassis 12 and is integrated with the main chassis 12 into a single body through a riveting or spot welding process, the process of producing the chassis assembly 10 is complicated, reducing productivity of the chassis assembly 10. When the bottom chassis 14 is integrally formed with the main chassis 12 through a pressing process, the size of the main chassis 12 is enlarged, resulting in time consumption while preparing metal molds for the main chassis.

FIGS. 2 to 6 show the construction of a chassis assembly for computers in accordance with a preferred embodiment of the present invention. In FIGS. 2 to 6, the same members of the chassis assembly as those in the assembly of FIG. 1 are denoted by the same reference numerals as those in the assembly.

Figure 2:
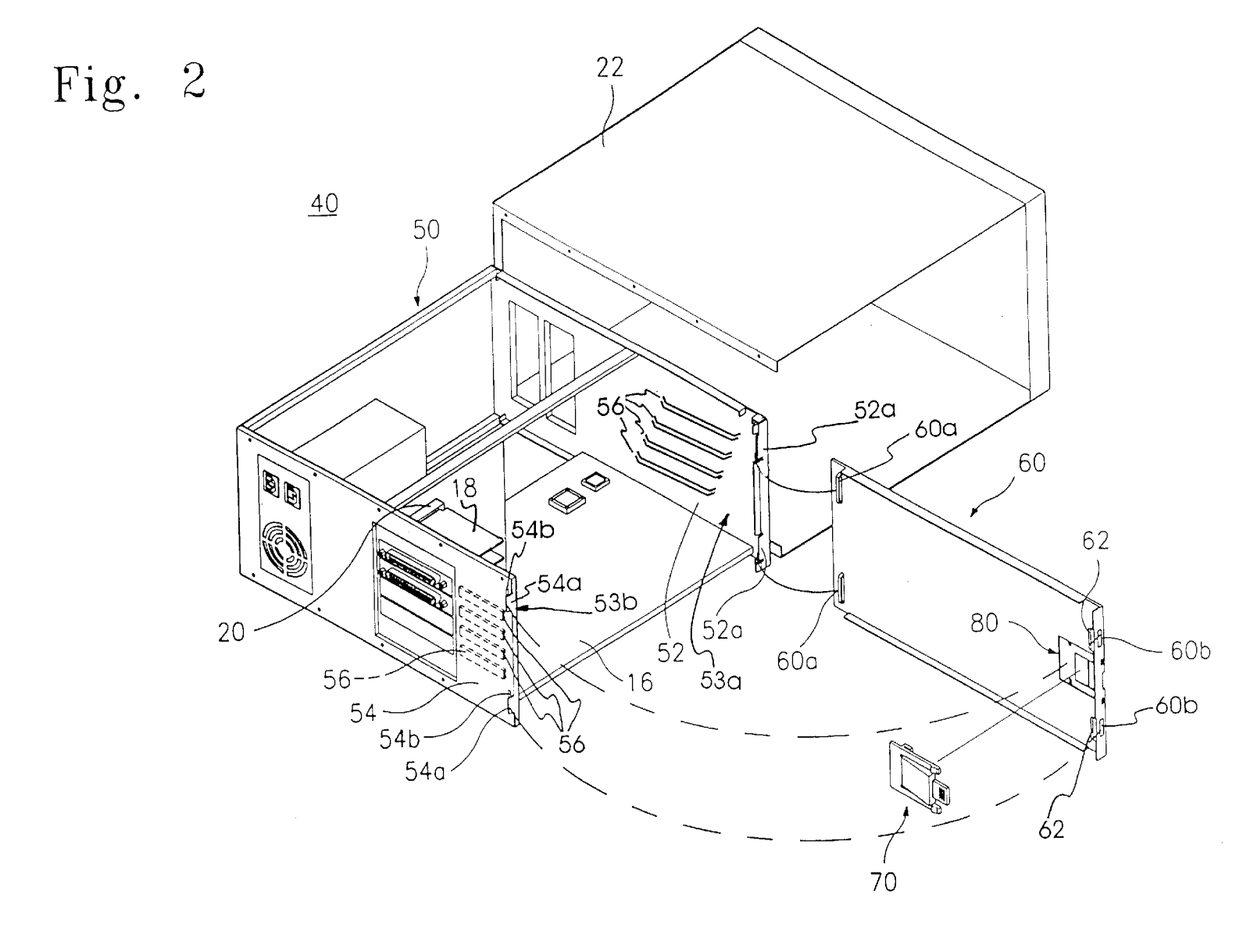
FIG. 2 is an exploded perspective view showing the construction of a chassis assembly for computers in accordance with a preferred embodiment of the present invention.

As shown in the FIG. 2, the chassis assembly 40 of this invention, which is designed to be used with a tower desktop computer, comprises three parts: a main chassis 50, a bottom chassis 60 and a lock unit 70. The main chassis 50 is open at its bottom, while the bottom chassis 60 is detachably attached to the open bottom of the main chassis 50. The lock unit 70 is mounted at a predetermined position of the bottom chassis's rear portion and allows a user to manually assemble or disassemble the bottom chassis 60 with or from the main chassis 50.

That is, the main chassis 50 of this invention is open at the bottom defined between the lower edges of front and rear panels 52 and 54. An option board, with a plurality of expansion slots 20, is installed inside the rear panel 54 of the main chassis 50 at a position perpendicular to a mother board 16. The above bottom chassis 60 is designed to be detachably mounted to the open bottom of the main chassis between the front and rear panels 52 and 54.

The lock unit 70, which is installed at a predetermined position of the bottom chassis's rear portion, such predetermined position preferably being as shown in FIG. 2, is designed to stably keep the bottom chassis 60 in the open bottom of the main chassis 50 when the two chassis 50 and 60 are assembled into a single body. The lock unit 70 can be partially and elastically moved by a user, thus allowing the bottom chassis 60 to be removed from the open bottom of the main chassis 50.

Figure 3:
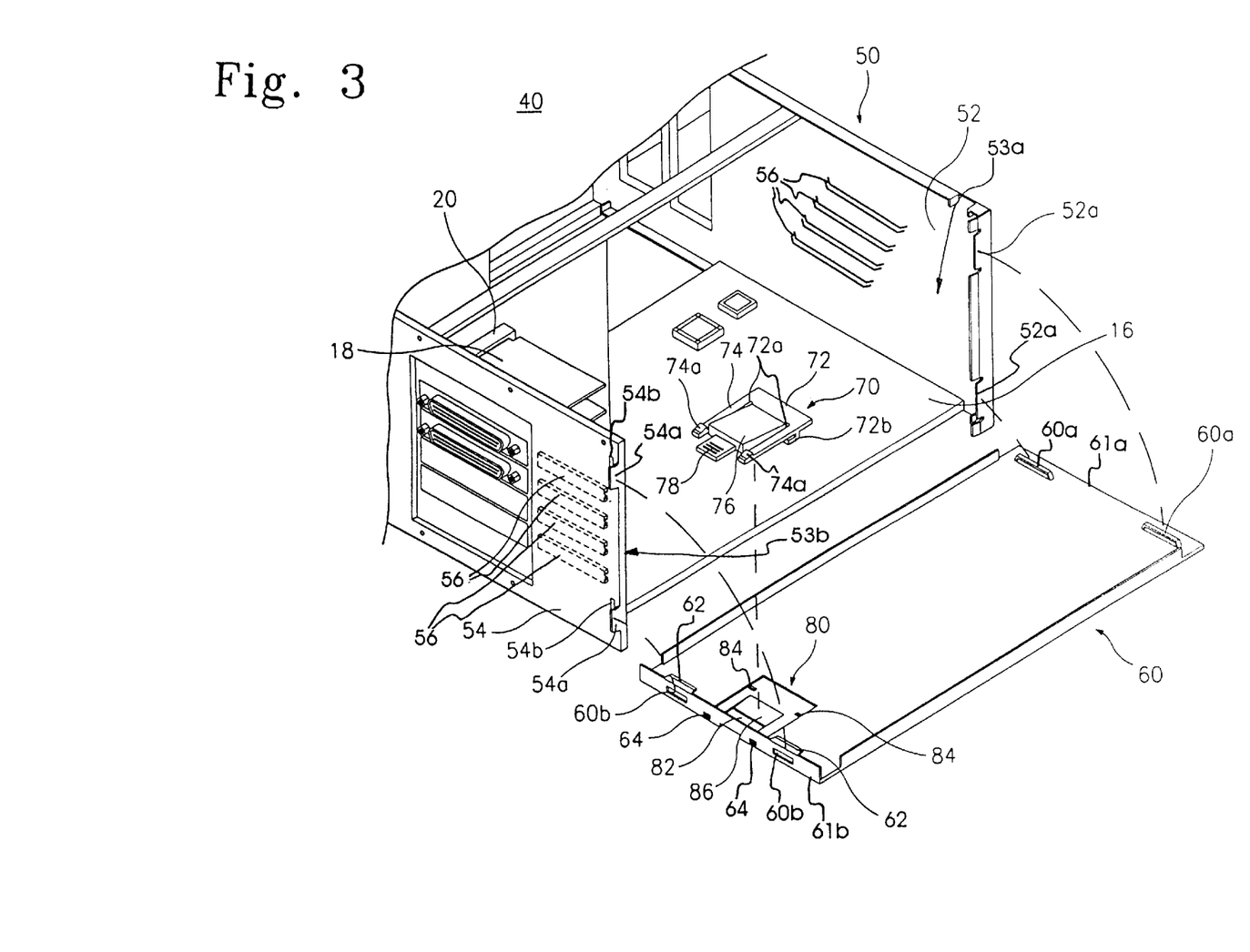
FIG. 3 an exploded perspective view showing the construction of main and bottom chassis of the chassis assembly of a preferred embodiment of the present invention in detail.
Figure 4:
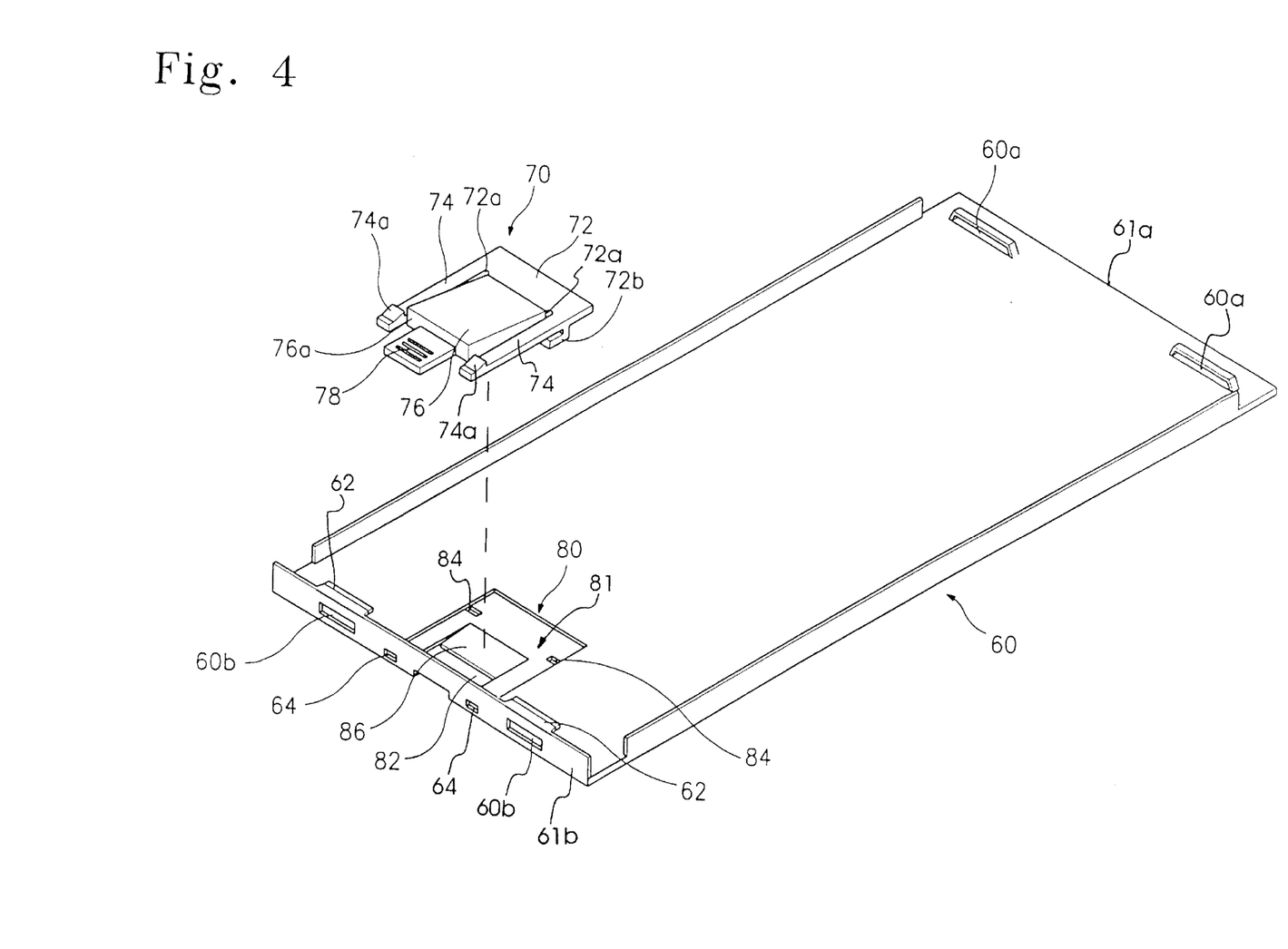
FIG. 4 is an exploded perspective view showing the construction of the bottom chassis and a lock unit of the chassis assembly of a preferred embodiment of the present invention in detail.

FIG. 3 is an exploded perspective view showing the construction of the main and bottom chassis 50 and 60 in detail. FIG. 4 is an exploded perspective view showing the construction of the bottom chassis 60 and the lock unit 70.

As shown in FIGS. 2–4, the front and rear panels 52 and 54 of the main chassis 50 individually have two longitudinal locking tabs 52a, 54a at spaced positions around the lower edge of front and rear panels 52 and 54. The locking tabs 52a and 54a extend in a direction from the front panel 52 to the rear panel 54. The rear panel 54 also has two longitudinal guide slots 54b at positions around the lower edge of rear panel 54. In the bottom chassis 60, one end or the front end 61a is horizontally flat, while the other end or the rear end 61b is flanged. Each end 61a, 61b of the bottom chassis 60 respectively has two longitudinal locking slots 60a, 60b at positions corresponding to the locking tabs 52a, 54a of the main chassis 50. The locking tabs 52a and 54a are thus brought into engagement with the locking slots 60a and 60b when the bottom chassis 60 is mounted to the open bottom of the main chassis 50.

As best seen in FIG. 4, two guide tabs 62 are formed on the flanged rear end 61b of the bottom chassis 60 at positions around the locking slots 60b. The two tabs 62 extend in a forward direction, thus being inserted into the guide slots 54b of the main chassis 50 when mounting the bottom chassis 60 to the main chassis 50. Two latching slots 64 are formed on the flanged rear end 61b of the bottom chassis 60 at positions to the inside between the two locking slots 60b. The bottom chassis 60 also has a lock unit seat 80 for the lock unit 70 at the middle or center portion of the rear end 61b.

A plurality of guide rails 56 are formed on the interior surface 53a, 53b of the front or rear panel 52, 54 of the main chassis 50 in a direction perpendicular to the bottom chassis 60. The above guide rails 56 are for precisely guiding an option card 18 into an expansion slot 20.

The lock unit seat 80, having a rectangular configuration, is formed by depressing the rear center portion of the bottom chassis 60 to form a depressed portion 81 in the bottom chassis 60. The lock unit seat 80 comprises a rectangular opening 82 formed at a position approximate to the rear center portion of the bottom chassis 60. Two seating slots 84 are formed on the lock unit seat 80 at opposite positions spaced apart from the inside edge of the above opening 82.

A beveled part 86 having a sloping configuration is provided at the intermediate portion between the opening 82 and the two seating slots 84, thus allowing the lock unit 70 to be smoothly and elastically bent by a user. The beveled part 86 also limits the bending angle of the lock unit 70 when the lock unit 70 is bent by a user.

With reference to FIGS. 3 and 4, the lock unit 70 is cast or formed into or as a single or unitary structure and includes a flat leading body 72, a pair of two longitudinal hook arms 74, a rectangular snap hook 76, a handle 78, and two bottom seating hooks 72b. The hook arms 74 integrally extend in a lengthwise direction from the leading body 72 to a predetermined length at opposite sides of the lock unit 70 and individually have a locking pawl 74a at their distal end. The locking pawls 74a of the two arms 74 are brought into engagement with the latching slots 64 of the bottom chassis 60 when the lock unit 70 is seated in the lock unit seat 80 of the bottom chassis 60. The snap hook 76 integrally extends from the body 72 at the intermediate position between the two hook arms 74 and is separated from the two arms 74 by a pair of channels 72a, so the snap hook 76 can be elastically bent relative to the arms 74. The top surface of the snap hook 76 is inclined upwardly in a direction from the leading body 72 to the distal end of the hook 76, so the distal end of the hook 76 is thicker than the connected to body 72 end. The handle 78 is integrated with the distal end of the snap hook 76, while the bottom seating hooks 72b, individually having an L-shaped cross-section, are transversely formed abreast on the bottom surface of the body 72. The bottom seating hooks 72b are brought into engagement with the two seating slots 84 of the lock unit seat 80 when the lock unit 70 is seated in the lock unit seat 80.

In the lock unit 70, the distal end of the snap hook 76 is terminated by a vertical surface or a stop surface 76a. The handle 78 is designed to be protruded from the flanged end 61b of the bottom chassis 60 to a predetermined length when the lock unit 70 is seated in the lock unit seat 80, thus allowing a user to easily reach the handle 78 when the lock unit 70 is manipulated by the user.

Figure 5:
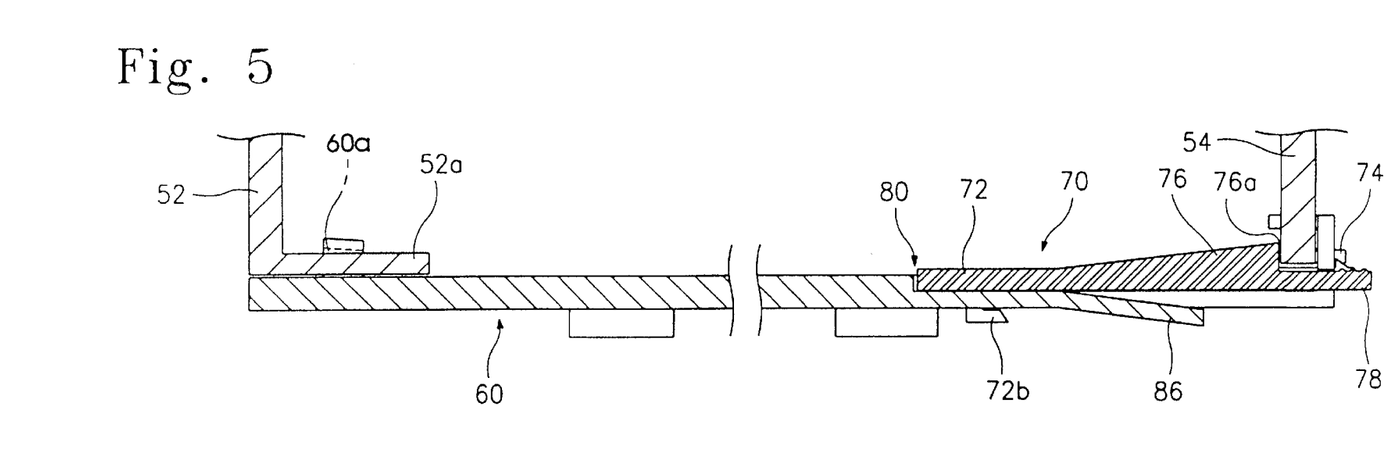
FIG. 5 is a sectional view showing the operation of the chassis assembly of a preferred embodiment of the present invention, with the main and bottom chassis being assembled into a single body.

In order to mount the bottom chassis 60 to the open bottom defined between the front and rear panels 52 and 54 of the main chassis 50, the bottom chassis 60 is primarily arranged on the open bottom of the main chassis 50 in a way such that the locking slots 60a and 60b of the bottom chassis 60 are respectively aligned with the locking tabs 52a and 54a of the main chassis's front and rear panels 52 and 54. Thereafter, the bottom chassis 60 is appropriately pressed and pushed forwardly thus bringing the locking slots 60a and 60b of the bottom chassis 60 into engagement with the locking tabs 52a and 54a of the main chassis 50 as shown in FIG. 5 and as diagrammatically illustrated in FIGS. 2 and 3. In such a case, the two guide tabs 62 of the bottom chassis 60 are fitted into the guide slots 54b of the rear panel 54.

Figure 6:
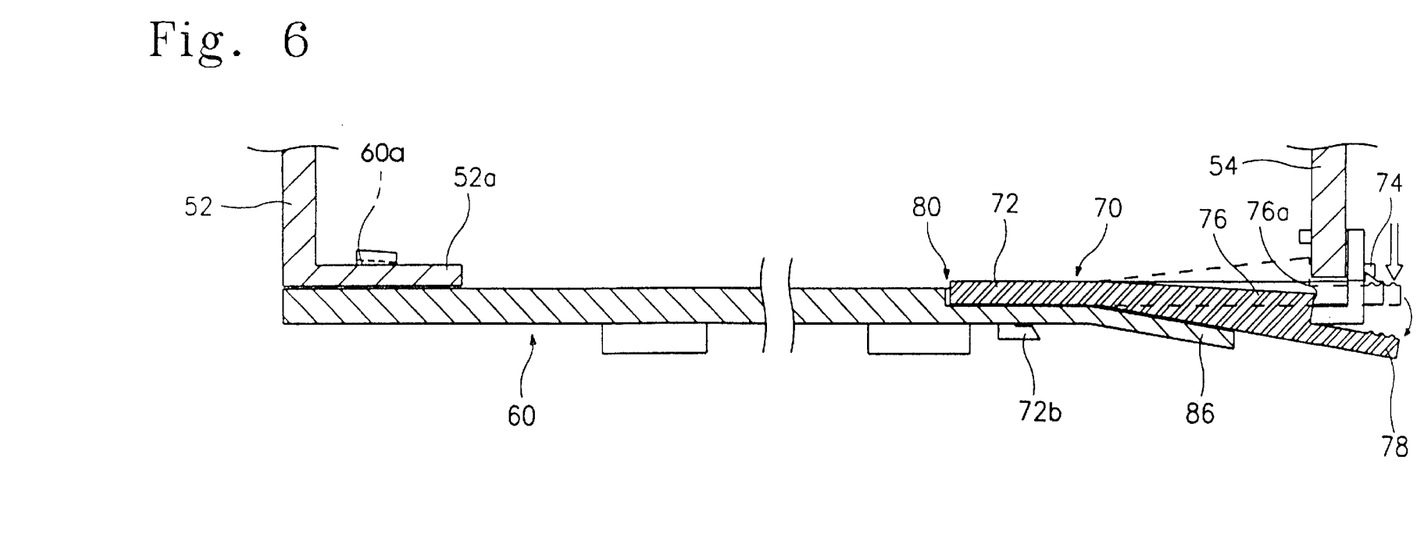
FIG. 6 is a sectional view showing the operation of the chassis assembly of a preferred embodiment of the present invention when the bottom chassis is removed from the main chassis, such as while repairing or upgrading a computer.

When the bottom chassis 60 is mounted to the open bottom of the main chassis 50, the lock unit 70, seated in the lock unit seat 80 of the bottom chassis 60, is operated as follows. Referring to FIGS. 5 and 6, the snap hook 76 of the lock unit 70 is biased by the edge of the rear panel 54 at the inclined surface, thus being temporarily deflected prior to being elastically returned to its original position at the time the bottom chassis 60 is completely positioned at its place on the open bottom of the main chassis 50. Thereafter, the edge of the rear panel 54 is tightly interposed between the stop surface 76a of the snap hook 76 and the flanged rear end 61b of the bottom chassis 60, thus preventing the bottom chassis 60 from being unexpectedly separated from the main chassis 50.

In order to remove the bottom chassis 60 from the main chassis 50 prior to repairing or upgrading the computer, the computer is primarily overturned, thus allowing the bottom chassis 60 to be positioned on the top. Thereafter, the handle 78 of the lock unit 70 is pulled as indicated by the arrow illustrated in FIG. 6 by a user, so the snap hook 76, separated from the hook arms 74 by the channels 72a, is elastically bent until a surface portion of the hook 76 comes into contact with the beveled part 86 of the lock unit seat 80 as shown in FIG. 6. In such a case, the stop surface 76a of the snap hook 76 is fully released from the rear panel 54 of the main chassis 50.

The bottom chassis 60 is, thereafter, forcibly pulled in a direction from the front panel 52 to the rear panel 54, so the locking slots 60a and 60b and the guide tabs 62 of the bottom chassis 60 are respectively removed from the locking tabs 52a and 54a and the guide slots 54b of the main chassis 50. The bottom chassis 60 is thus easily removed from the main chassis 50.

When the bottom chassis 60 is removed from the main chassis 50 as described above, the open bottom between the front and rear panels 52 and 54 of the main chassis 50 is exposed to the atmosphere, thus allowing the user to reach the interior of the computer so as to repair or upgrade the computer. That is, the chassis assembly of this invention allows a user to easily repair the computer or upgrade the computer by inserting an option card 18 into an expansion slot 20 under the guide of the guide rails 56 of the front or rear panel 52, 54.

As described above, the present invention provides a chassis assembly for computers, which including a bottom chassis and a main chassis suitable for being manually assembled and disassembled, thus allowing a user to easily handle the assembly with improved work efficiency while repairing or upgrading a computer. That is, in the chassis assembly for mounting a power supply unit and a plurality of auxiliary units, such as a power supply, a hard disc drive, a floppy disc drive and a compact disc drive, to the computer housing, the main chassis and bottom chassis are designed to be easily and manually assembled and disassembled. In addition, a plurality of expansion slots for option cards are provided on the main chassis at positions perpendicular to the bottom chassis.

When it is necessary to repair or upgrade the computer, the bottom chassis can be easily removed from the main chassis by manually operating the handle of a lock unit installed on the bottom chassis. Therefore, the chassis assembly of this invention allows a user to reach the interior of the chassis assembly without removing the cover from the chassis assembly, thus being convenient to the user while repairing or upgrading the computer.

Since the main chassis and bottom chassis of the chassis assembly are designed to be selectively disassembled from each other, it is not necessary to integrate the main chassis and bottom chassis into a single structure through a riveting or spot welding process as in a typical chassis assembly. The process of producing the chassis assembly is thus simplified, improving productivity in assembly of the chassis assemblies.

Another advantage of the present invention resides in that the bottom chassis is not cast with the main chassis, thus allowing the size of the main chassis to be reduced and simplifying the pressing process of forming the main chassis. Therefore, the chassis assembly of this invention reduces time and cost associated with preparing metal molds.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A chassis assembly for a computer, comprising:

a main chassis having a front panel and a rear panel, said main chassis having an open bottom defined between lower edges of said front panel and said rear panel;

a bottom chassis detachably mounted to said open bottom of said main chassis;

a lock unit mounted to a rear portion of said bottom chassis at a predetermined position for retaining a position of said bottom chassis relative to said main chassis and for selectively allowing the bottom chassis to be manually removed from the main chassis;

a locking tab provided at the lower edge of each of said front panel and said rear panel, each said locking tab extending in a direction from said front panel to said rear panel;

a guide slot formed at the lower edge of said rear panel;

a locking slot formed on each end of said bottom chassis at a position corresponding to a corresponding said locking tab for detachable engagement with said corresponding locking tab;

a guide tab formed on said bottom chassis at a position corresponding to said guide slot for detachable engagement with the guide slot; and a lock unit seat formed at the rear portion of said bottom chassis for seating said lock unit.

2. The chassis assembly according to claim 1, wherein a pair of locking tabs are provided at the lower edge of each of said front panel and said rear panel, each of said pair of locking tabs extending in a direction from said front panel to said rear panel, a pair of guide slots are formed at the lower edge of said rear panel, a pair of locking slots are formed on each end of said bottom chassis at a position corresponding to a corresponding said locking tab for detachable engagement with said corresponding locking tab, and a pair of guide tabs are formed on said bottom chassis each at a position corresponding to a corresponding said guide slot for detachable engagement with said corresponding guide slot.

3. The chassis assembly according to claim 1, wherein said lock unit seat is formed in rear center portion of said bottom chassis as a depressed portion in said bottom chassis, and said lock unit seat comprises:

an opening formed within said depressed portion at a position approximate to said rear center portion of said bottom chassis;

a seating slot formed within said depressed portion at a position spaced apart from an inside edge of said opening for engagement with a seating hook formed on a bottom surface of said lock unit; and a beveled part having a sloping configuration provided within said depressed portion at an intermediate portion between said opening and said seating slot to allow the lock unit to be smoothly bent by a user.

4. The chassis assembly according to claim 1, further comprising a plurality of guide rails formed on an interior surface of at least one of said front panel and said rear panel of said main chassis, said plurality of guide rails extending perpendicular to said bottom chassis for guiding an option card into an expansion slot located within said chassis assembly for said computer.

5. A chassis assembly for a computer, comprising:

a main chassis having a front panel and a rear panel, said main chassis having an open bottom defined between lower edges of said front panel and said rear panel;

a bottom chassis detachably mounted to said open bottom of said main chassis; and a lock unit mounted to a rear portion of said bottom chassis at a predetermined position for retaining a position of said bottom chassis relative to said main chassis and for selectively allowing the bottom chassis to be manually removed from the main chassis, wherein said lock unit is formed as a unitary structure and said lock unit comprises:

a flat leading body;

a pair of longitudinal hook arms integrally extending from said leading body in a lengthwise direction to a predetermined length, each of said pair of longitudinal hook arms being respectively positioned at opposite sides of said lock unit and being individually terminated by a locking pawl, each said locking pawl for engagement with a corresponding latching slot of said bottom chassis;

a resilient snap hook integrally extending from said leading body at an intermediate position between said pair of hook arms, said snap hook being respectively separated from said pair of hook arms by a pair of channels, said snap hook being thicker at its distal end forming a stop surface at said distal end;

a handle integrated with said distal end of said snap hook for allowing a user to manipulate said lock unit from the outside of said bottom chassis; and a seating hook transversely formed on a bottom surface of said leading body for engagement with a seating slot formed on a lock unit seat of said bottom chassis.

6. The chassis assembly according to claim 5, wherein said lock unit is cast into a single structure.

7. The chassis assembly according to claim 5, wherein at least one said seating hook is transversely formed on said bottom surface of said leading body and each said seating hook is for engagement with a corresponding seating slot formed on said lock unit seat of said bottom chassis.

8. The chassis assembly according to claim 5, wherein said lock unit seat is formed in a rear center portion of said bottom chassis as a depressed portion in said bottom chassis, and said lock unit seat comprises:

an opening formed within said depressed portion at a position approximate to said rear center portion of said bottom chassis;

a seating slot formed within said depressed portion at a position spaced apart from an inside edge of said opening for engagement with a seating hook formed on a bottom surface of said lock unit; and a beveled part having a sloping configuration provided within said depressed portion at an intermediate portion between said opening and said seating slot to allow said lock unit to be smoothly bent by a user.

9. The chassis assembly according to claim 8, further comprising:

a locking tab provided at the lower edge of each of said front panel and said rear panel, each said locking tab extending in a direction from said front panel to said rear panel;

a guide slot formed at the lower edge of said rear panel;

a locking slot formed on each end of said bottom chassis at a position corresponding to a corresponding said locking tab for detachable engagement with said corresponding locking tab;

a guide tab formed on the bottom chassis at a position corresponding to said guide slot for detachable engagement with said guide slot; and wherein said lock unit seat is formed at said rear center portion of said bottom chassis for seating said lock unit.

10. The chassis assembly according to claim 9, further comprising a plurality of guide rails formed on an interior surface of at least one of said front panel and said rear panel of said main chassis, said plurality of guide rails extending perpendicular to said bottom chassis for guiding an option card into an expansion slot located within said chassis assembly for said computer.

11. The chassis assembly according to claim 5, further comprising:

a locking tab provided at the lower edge of each of said front panel and said rear panel, each said locking tab extending in a direction from said front panel to said rear panel;

a guide slot formed at the lower edge of said rear panel;

a locking slot formed on each end of said bottom chassis at a position corresponding to a corresponding said locking tab for detachable engagement with said corresponding locking tab;

a guide tab formed on said bottom chassis at a position corresponding to said guide slot for detachable engagement with said guide slot; and a lock unit seat formed at said rear portion of said bottom chassis, said lock unit seat for seating said lock unit.

12. The chassis assembly according to claim 11, further comprising a plurality of guide rails formed on an interior surface of at least one of said front panel and said rear panel of said main chassis, said plurality of guide rails extending perpendicular to said bottom chassis for guiding an option card into an expansion slot located within said chassis assembly for said computer.

13. The chassis assembly according to claim 5, further comprising a plurality of guide rails formed on an interior surface of at least one of said front panel and said rear panel of said main chassis, said plurality of guide rails extending perpendicular to said bottom chassis for guiding an option card into an expansion slot located within said chassis assembly for said computer.

14. A lock unit for a chassis assembly for a computer, comprising:

a flat leading body;

a pair of longitudinal hook arms integrally extending from said leading body in a lengthwise direction to a predetermined length, each of said pair of longitudinal hook arms being respectively positioned at opposite sides of said lock unit and being individually terminated by a locking pawl, each said locking pawl for engagement with a corresponding latching slot of a bottom chassis detachable from said chassis assembly;

a resilient snap hook integrally extending from said leading body at an intermediate position between said pair of hook arms, said snap hook being respectively separated from said pair of hook arms by a pair of channels, said snap hook being thicker at its distal end forming a stop surface at said distal end;

a handle integrated with said distal end of said snap hook for allowing a user to manipulate said lock unit from the outside of said bottom chassis of said chassis assembly; and a seating hook transversely formed on a bottom surface of said leading body for engagement with a seating slot formed on a lock unit seat of said bottom chassis of said chassis assembly.

15. The locking unit according to claim 14, wherein said lock unit is cast into a single structure.

* * * * *